US012804246B2

(12) United States Patent
Yuan et al.

(10) Patent No.: US 12,804,246 B2

(45) Date of Patent: Nov. 17, 2026

(54) CAMERA AND LIGHT ADJUSTMENT MODULE

(71) Applicant: Chicony Electronics Co., Ltd., New Taipei City (TW)

(72) Inventors: Shang-Yuan Yuan, New Taipei City (TW); Chien-Yueh Chen, New Taipei City (TW)

(73) Assignee: Chicony Electronics Co., Ltd., New Taipei City (TW)

( * ) Notice: Subject to any disclaimer, the term of this patent is extended or adjusted under 35 U.S.C. 154(b) by 52 days.

(21) Appl. No.: 19/007,710

(22) Filed: Jan. 2, 2025

(65) Prior Publication Data

US 2026/0019695 A1 Jan. 15, 2026

(30) Foreign Application Priority Data

Jul. 12, 2024 (TW) ................................ 113126348

(51) Int. Cl.

| | |
|---|---|
| ***H04N 23/56*** | (2023.01) |
| ***F21V 7/06*** | (2006.01) |
| ***F21V 14/02*** | (2006.01) |
| ***F21Y 115/10*** | (2016.01) |
| ***H04N 23/55*** | (2023.01) |

(Continued)

(52) U.S. Cl.

CPC ............... *H04N 23/56* (2023.01); *F21V 7/06* (2013.01); *F21V 14/02* (2013.01); *H04N 23/55* (2023.01); *H04N 23/74* (2023.01); *H04N 23/75* (2023.01); *F21Y 2115/10* (2016.08)

(58) Field of Classification Search

CPC ........ H04N 23/56; H04N 23/55; H04N 23/74; H04N 23/75; F21V 7/06; F21V 14/02; F21Y 2115/10

See application file for complete search history.

(56) References Cited

U.S. PATENT DOCUMENTS 3,987,296 A * 10/1976 Coppola ................ F21V 21/30 362/277

8,786,765 B1 * 7/2014 Yang ..................... H04N 23/56 348/370

11,221,134 B1 * 1/2022 Zhang .................. F21V 33/008

(Continued)

FOREIGN PATENT DOCUMENTS

TW 201502684 A 1/2015

*Primary Examiner* — Jason A Flohre

(74) *Attorney, Agent, or Firm* — MUNCY, GEISSLER, OLDS & LOWE, P.C.

(57) ABSTRACT

A light adjustment module for a camera includes a substrate and a plurality of light adjustment assemblies. The substrate has a lens arrangement region. The light adjustment assemblies are spaced apart from each other and surround the lens arrangement region. Each of the light adjustment assemblies includes a light-emitting unit, a light-guiding member, and an actuator. The light-emitting unit includes a movable member and a light-emitting member, and the light-emitting member is on the movable member. The light-guiding member has a reflective surface facing the light-emitting member. The actuator is configured to drive the movable member to move with respect to the light-guiding member, so that the light-emitting member is moved toward or away from the light-guiding member. A camera including the light adjustment module is also provided.

11 Claims, 10 Drawing Sheets

(51) Int. Cl.
*H04N 23/74* (2023.01)
*H04N 23/75* (2023.01)

(56) References Cited

U.S. PATENT DOCUMENTS

| | | | | |
|---|---|---|---|---|
| 2010/0284184 A1* | 11/2010 | Yang | G03B 15/04 | 362/249.07 |
| 2014/0192258 A1* | 7/2014 | Yang | H04N 23/56 | 348/370 |
| 2015/0009398 A1* | 1/2015 | Shih | H04N 23/74 | 348/370 |
| 2015/0184815 A1* | 7/2015 | Horn | F21K 9/65 | 313/36 |
| 2015/0381909 A1* | 12/2015 | Butte | A61B 1/00188 | 250/578.1 |
| 2018/0275489 A1* | 9/2018 | Hung | H04N 23/698 | |

* cited by examiner

CAMERA AND LIGHT ADJUSTMENT MODULE

CROSS-REFERENCE TO RELATED APPLICATION

This non-provisional application claims priority under 35 U.S.C. § 119(a) to patent application No. 113126348 filed in Taiwan, R.O.C. on Jul. 12, 2024, the entire contents of which are hereby incorporated by reference.

BACKGROUND

Technical Field

The instant disclosure relates to an electronic device, in particular, to a camera and a light adjustment module.

Related Art

For cameras known to the inventor, a light source, e.g., light-emitting diode (LED), is usually applied to be served as the supplementary lighting. Therefore, when a camera known to the inventor performs image capturing procedures, clearer images can be obtained owing to the illumination of the light source. Moreover, with the application of the light source, images can be captured with sufficient brightness at night or in low light conditions.

SUMMARY

However, upon operating the camera, the user may have different lighting requirements for different environments or time periods. If the camera adopts a single fixed light source, the performance of the image capturing may be different from that as expected. For example, if the camera is installed at an outdoor environment, the light source can provide sufficient lighting to allow the camera to capture a clear image; however, in the case that such camera is installed at an indoor environment, if the camera adopts the same light source, the image captured by the camera may be overexposed.

In view of this, in one embodiment, a light adjustment module for a camera is provided. The light adjustment module comprises a substrate and a plurality of light adjustment assemblies. The substrate has a lens arrangement region. The light adjustment assemblies are on the substrate. The light adjustment assemblies are spaced apart from each other and surround a periphery of the lens arrangement region. Each of the light adjustment assemblies comprises a light-emitting unit, a light-guiding unit, and an actuating unit. The light-emitting unit comprises a movable member and a light-emitting member, and the light-emitting member is on the movable member. The light-guiding member has a reflective surface facing the light-emitting member. The actuator is connected to the movable member, the actuator is configured to selectively drive the movable member to move with respect to the light-guiding member, so that the light-emitting member is moved toward or away from the light-guiding member.

In another embodiment, a camera is provided and comprises a camera body, an aforementioned light adjustment module, and a camera lens. The light adjustment module is inside the camera body, and the camera lens is on the lens arrangement region of the substrate of the light adjustment module.

As above, according to the light adjustment module of one or some embodiments of the instant disclosure, depending on the actual application scenarios (such as the environment, the time, the installation position of the camera, the orientation of the camera, or the like), by using the actuator to drive the light-emitting member to move toward or away from the light-guiding member, the light can be guided by the reflective surface so as to generate a proper field of illumination, thereby allowing the image captured by the camera to have a good quality.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. Moreover, in the figures, some components are omitted to show the technical features of the instant disclosure clearly. Furthermore, in all the figures, the same reference numbers refer to identical or similar elements.

Figure 1:
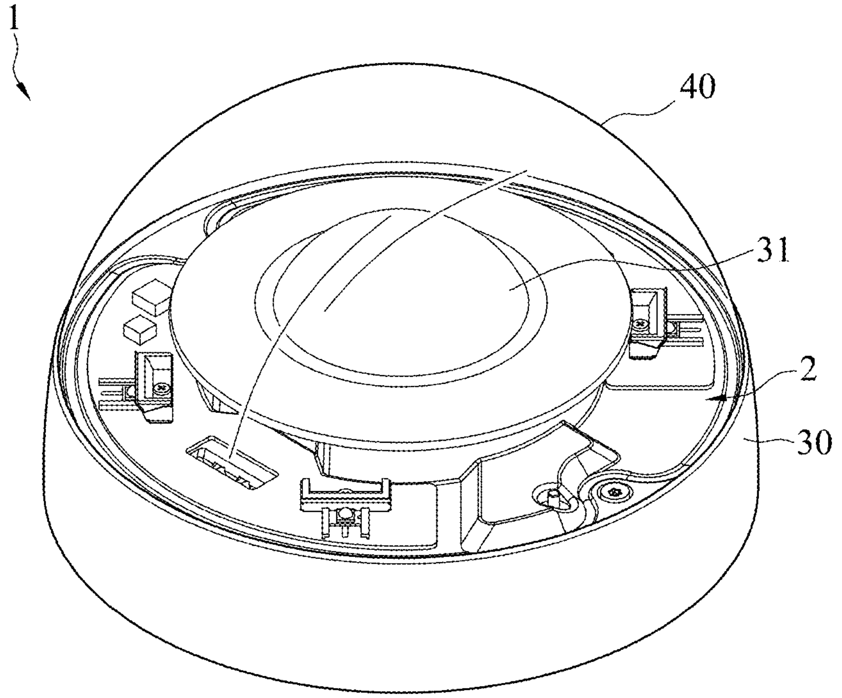
FIG. 1 illustrates a perspective view of a camera according to an exemplary embodiment of the instant disclosure.

FIG. 1 illustrates a perspective view of a camera according to an exemplary embodiment of the instant disclosure.

As shown in FIG. 1, in this embodiment, the camera 1 comprises a camera body 30, a light adjustment module 2, and a camera lens 31. In some embodiments, the camera 1 may be an IP camera, a network camera, a closed-circuit television (CCTV), an analog surveillance camera, or the like. Furthermore, the camera 1 is adapted to be installed at different places (e.g., a kinder garden, an office, a store, or a road), thus the camera 1 can perform the security surveillance function or record personnel activities.

Figure 2:
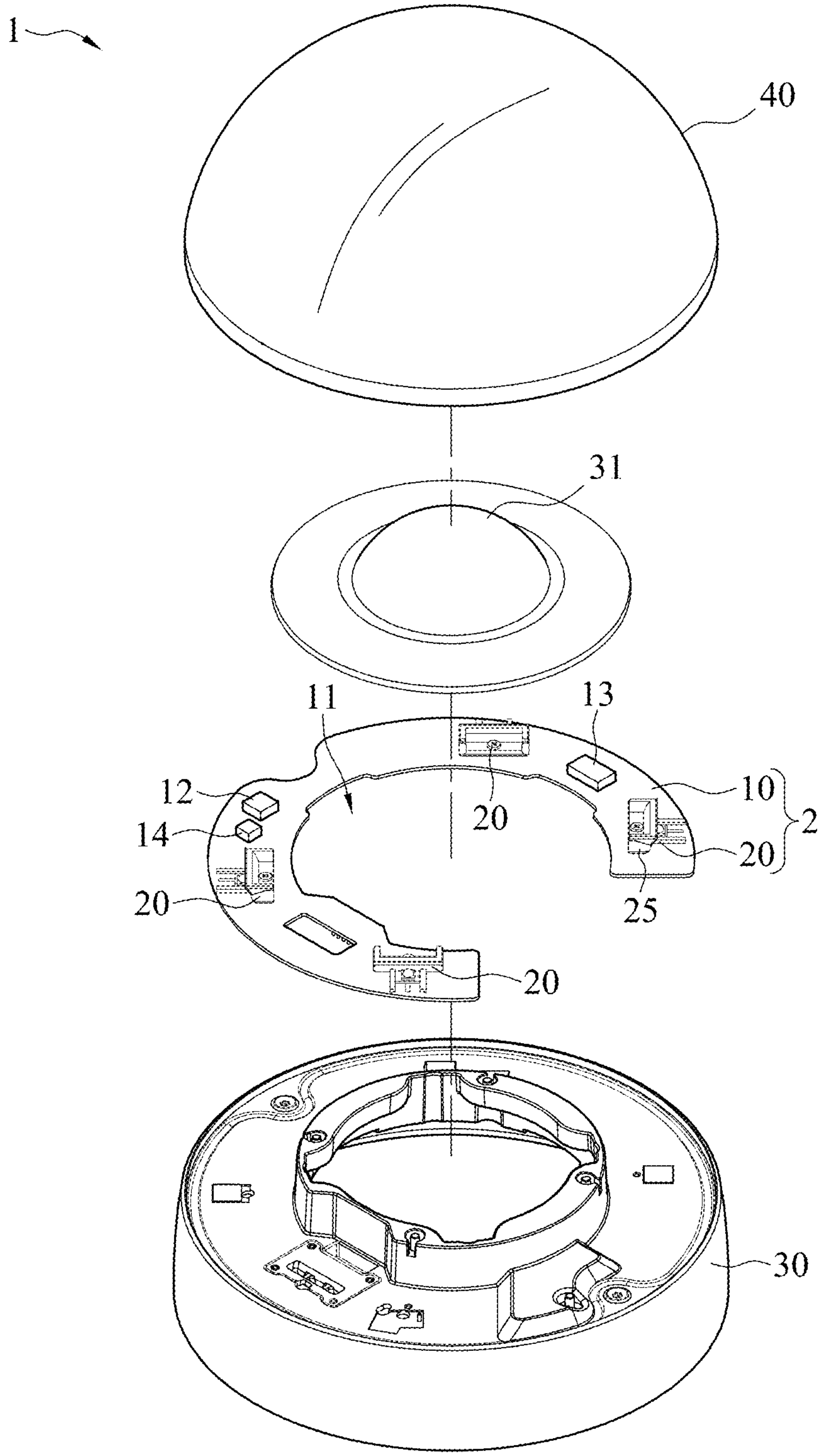
FIG. 2 illustrates an exploded view of the camera of the exemplary embodiment of the instant disclosure.
Figure 3:
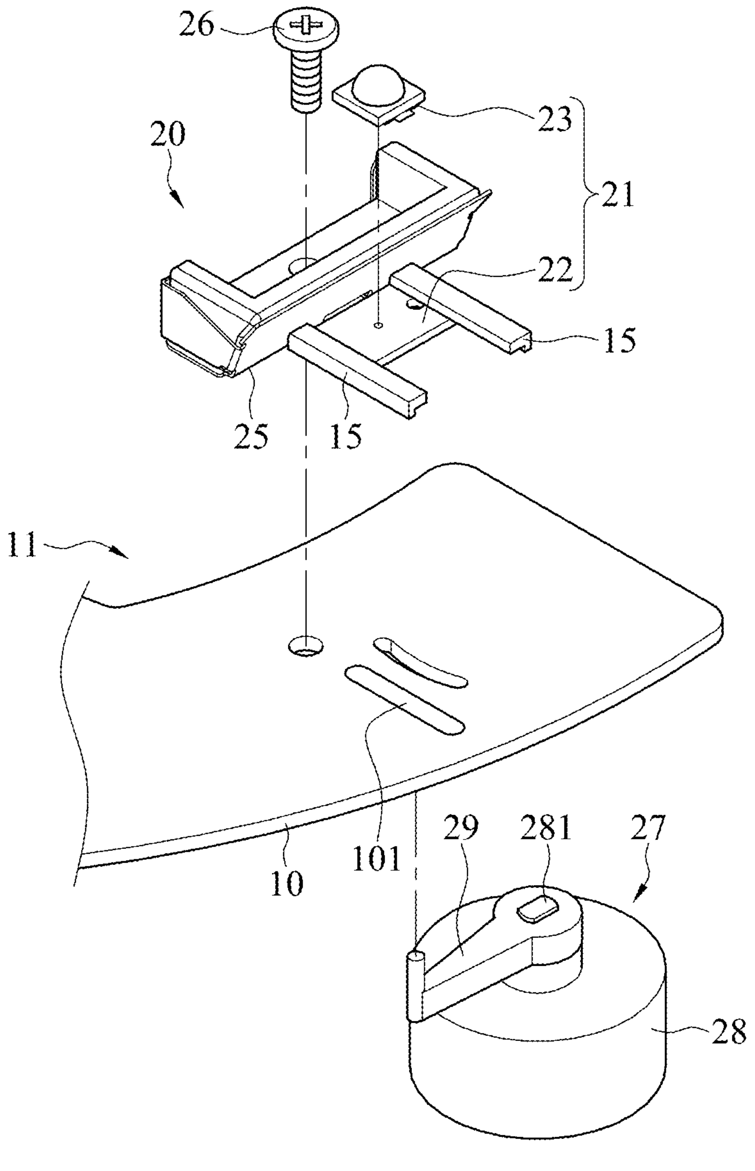
FIG. 3 illustrates an exploded view of a light adjustment module of the exemplary embodiment of the instant disclosure.

FIG. 2 illustrates an exploded view of the camera of the exemplary embodiment of the instant disclosure. FIG. 3 illustrates an exploded view of a light adjustment module of the exemplary embodiment of the instant disclosure. As shown in FIG. 1 to FIG. 3, the camera body 30 may be a hollowed housing, and the light adjustment module 2 is inside the camera body 30. The light adjustment module 2 comprises a substrate 10 and a plurality of light adjustment assemblies 20. In this embodiment, the number of the light adjustment assemblies 20 is four, but the instant disclosure is not limited thereto. The substrate 10 has a lens arrangement region 11 for being assembled with the camera lens 31. The light adjustment assemblies 20 are on the substrate 10, and the light adjustment assemblies 20 are spaced apart from each other and surround a periphery of the lens arrangement region 11.

In some embodiments, the light adjustment assemblies 20 may be equiangularly arranged (for example, 30 degrees, 45 degrees, or 60 degrees) around the periphery of the lens arrangement region 11 of the substrate 10 by taking the center of the lens arrangement regions 11 as a center for the arrangement. Alternatively, in some other embodiments, the light adjustment assemblies 20 may be arranged around the lens arrangement region 11 irregularly.

As shown in FIG. 1 to FIG. 3, in this embodiment, the substrate 10 of the light adjustment module 2 is a circuit board, and the lens arrangement region 11 is a central opening on the substrate 10, thereby configuring the substrate 10 to be an annular-shaped circuit board. The camera lens 31 is assembled on the camera body 30 and within the lens arrangement region 11 of the substrate 10. Therefore, the camera lens 31 can be prevented from being blocked by the substrate 10 and thus can capture images external to the camera 1. In some other embodiments, the lens arrangement region 11 of the substrate 10 may be a physical region, and the camera lens 31 may be assembled on the surface of the lens arrangement region 11.

As shown in FIG. 2 and FIG. 3, each of the light adjustment assemblies 20 of the light adjustment module 2 comprises a light-emitting unit 21, a light-guiding member 25, and an actuator 27. The light-emitting unit 21 comprises a movable member 22 and a light-emitting member 23, and the light-emitting member 23 is on the movable member 22. In some embodiments, the movable member 22 may be a circuit board, and the light-emitting member 23 is electrically connected to the movable member 22. For example, the light-emitting member 23 may be a light-emitting diode (LED) electrically connected to the movable member 22 through conductive wires, or the light-emitting member 23 may be assembled on the movable member 22 using surface-mount technology (SMT).

As shown in FIG. 1 to FIG. 3, in this embodiment, the camera 1 comprises a light-permissible shield 40. The light-permissible shield 40 is assembled on the camera body 30 and covers the camera lens 31 and the light adjustment module 2 to protect the camera lens 31 and the light adjustment module 2. Therefore, external lights can pass through the light-permissible shield 40 to be transmitted to the camera lens 31 for image capturing, and lights emitted from the light-emitting members 23 of the light adjustment module 2 can also pass through the light-permissible shield 40, so that the effect of supplementary lighting can be provided.

Figure 4:
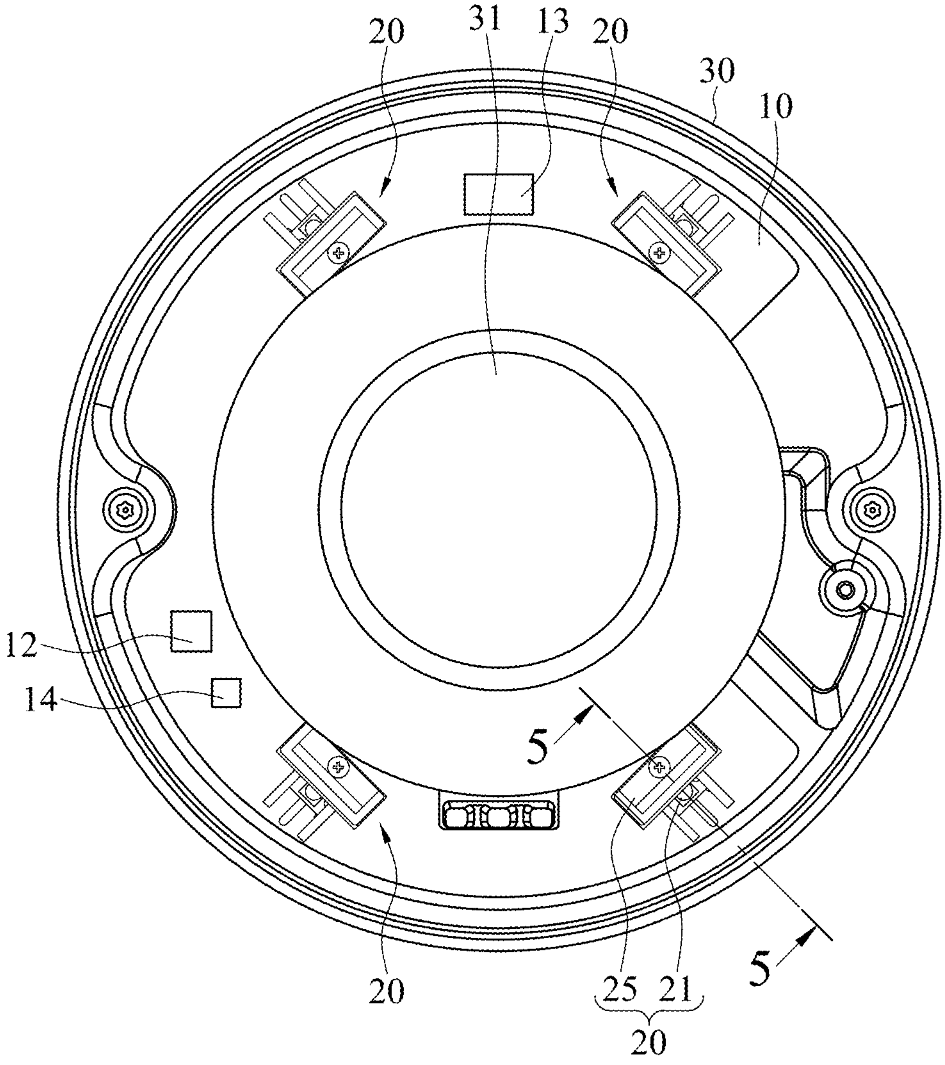
FIG. 4 illustrates a top view of the camera of the exemplary embodiment of the instant disclosure.
Figure 5:
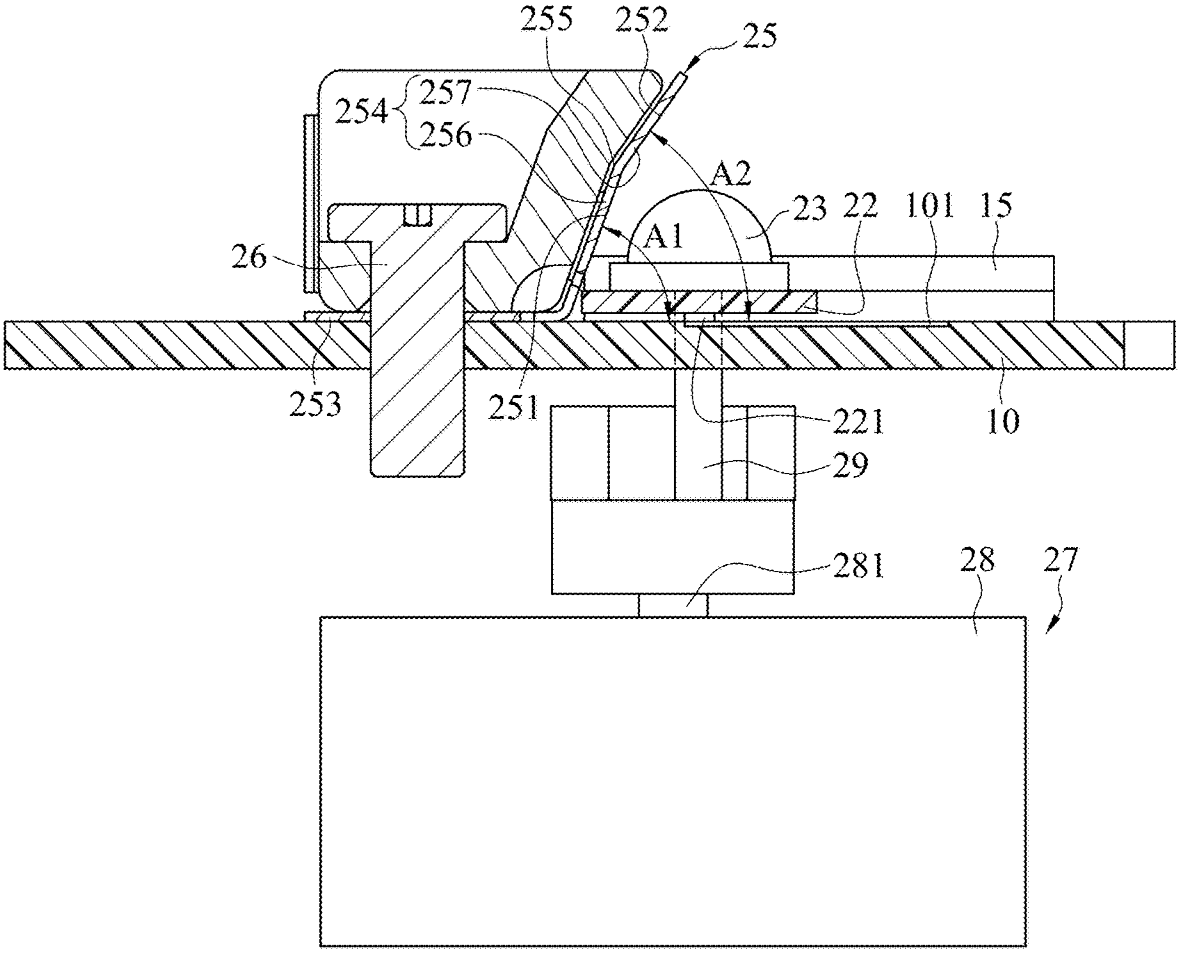
FIG. 5 illustrates a cross-sectional view along line 5-5 shown in FIG. 4.

FIG. 4 illustrates a top view of the camera of the exemplary embodiment of the instant disclosure. FIG. 5 illustrates a cross-sectional view along line 5-5 shown in FIG. 4. As shown in FIG. 2 to FIG. 5, for each of the light adjustment assemblies 20, the light-guiding member 25 is between the light-emitting unit 21 and the lens arrangement region 11. In other words, in this embodiment, the light-emitting unit 21 is nearer an outer periphery of the substrate 10 as compared with the light-guiding member 25 (namely, in this embodiment, for each of the light adjustment assemblies 20, a distance between the light-emitting unit 21 and the outer periphery of the substrate 10 is less than a distance between the light-guiding member 25 and the outer periphery of the substrate 10. In this embodiment, the light-guiding member 25 has a reflective surface (a first reflective surface 251 and a second reflective surface 252) facing the light-emitting member 23. The first reflective surface 251 is nearer the substrate 10 as compared with the second reflective surface 252; in other words, in some embodiments, a distance between the first reflective surface 251 and the substrate is less than a distance between the second reflective surface 252 and the substrate 10. The second reflective surface 252 is connected to the first reflective surface 251, and a first included angle A1 between the first reflective surface 251 and the substrate 10 is greater than a second included angle A2 between the second reflective surface 252 and the substrate 10, but the instant disclosure is not limited thereto. In some embodiments, the reflective surface of the light-guiding member 25 may be arranged according to different demands; for example, the light-guiding member 25 may have a reflective surface which has a single angle with the substrate 10. The light-guiding member 25 is configured to guide the lights emitted from the light-emitting members 23 to generate a proper field of illumination. In this embodiment, the light-guiding member 25 is configured to guide the lights to the surrounding of the camera 1, but the instant disclosure is not limited thereto.

In some embodiments, a length of the first reflective surface 251 and a length of the second reflective surface 252 may be identical with or different from each other, and the preferred length ratio between the first reflective surface 251 and the second reflective surface 252 may be determined according to the characteristics of the light-emitting members 23 or the field of illumination which is demanded.

As shown in FIG. 3 to FIG. 5, in this embodiment, the light-guiding member 25 of each of the light adjustment assemblies 20 is formed by integrally bending a plate. The light-guiding member 25 comprises a fixed plate 253 and a reflective plate 254. The fixed plate 253 is fixed on the substrate 10; for example, the fixed plate 253 may be locked on the substrate 10 through a screw 26. The reflective plate 254 is bent from one end of the fixed plate 253 toward a direction away from the substrate 10, and a bent portion 255 is between two ends of the reflective plate 254. Therefore, the reflective plate 254 forms a first plate 256 and a second plate 257 with different inclinations. The first plate 256 is integrally connected between the fixed plate 253 and the second plate 256. The surface of the first plate 256 facing the light-emitting member 23 is the first reflective surface 251, and the surface of the second plate 257 facing the light-emitting member 23 is the second reflective surface 252. In some other embodiments, the light-guiding member 25 of each of the light adjustment assemblies 20 may be a block or may be a component formed by assembling several members.

In some embodiments, the light-guiding member 25 of each of the light adjustment assemblies 20 may be made of light color material(s). For example, the light color material may be white or pale-yellow plastic materials, or the light color material may be dyed plastic materials (for example, dyed plastic materials with silver, gold, pale blue, pale green, or pale gray), so that the first reflective surface 251 and the second reflective surface 252 of light-guiding member 25 can have a better light reflection function. Alternatively, in some embodiments, the first reflective surface 251 and the second reflective surface 252 of the light-guiding member 25 each has a light reflective layer (not shown). For example, the light reflective layer may be a light color ink layer printed or coated on the first reflective surface 251 and the second reflective surface 252. For instance, the light color ink layer may be an ink layer with white, silver, gold, pale blue, pale green, pale yellow, or pale gray to have light reflection function. In a further option, in some embodiments, the light reflective layer may be a light color thin film layer. For example, the light color thin film layer may be a glass reflective film, a PET reflective film, a PVC reflective film, or other light color thin films to have a better light reflection function.

As shown in FIG. 3 to FIG. 5, the actuator 27 is connected to the movable member 22, and the actuator 27 can drive the movable member 22 to move with respect to the light-guiding member 25, so that the light-emitting member 23 on the movable member 22 can be moved toward or away from the light-guiding member 25. In this embodiment, the actuator 27 comprises a driving motor 28 (for example, a stepper motor or a linear motor) and a connecting member 29. The connecting member 29 may be for example a gear transmission mechanism, a worm wheel-worm screw mechanism, a cam mechanism, or a mechanical linkage. The driving motor 28 is connected to the movable member 22 through the connecting member 29. When the driving motor 28 operates, the driving motor 28 can drive the movable member 22 to move with respect to the light-guiding member 25 through the connecting member 29.

As shown in FIG. 2, FIG. 3, and FIG. 5, in this embodiment, the driving motor 28 has a shaft 281, the connecting member 29 is a swing arm, one of two ends of the connecting member 29 (the swing arm) is connected to the shaft 281, and the other end of the connecting member 29 (the swing arm) is pivotally connected to the movable member 22. The substrate is provided with a plurality of slide rails 15, the slide rails 15 surround the periphery of the lens arrangement region 11 and respectively correspond to the light adjustment assemblies 20, and the movable member 22 of each of the light adjustment assemblies 20 is slidably arranged between the slide rails 15. Therefore, when the driving motor 28 operates to rotate the shaft 281, the connecting member 29 can swing with respect to the substrate 10. Therefore, the connecting member 29 drives the movable member 22 to move along the slide rail 15 linearly, so that the light-emitting member 23 on the movable member 22 can be moved toward or away from the light-guiding member 25.

As above, according to the camera 1 of one or some embodiments of the instant disclosure, depending on the actual application scenarios of the camera 1 (such as the environment, the time, the installation position, the orientation, or the like), by using the actuator 27 to drive the light-emitting member 23 to move toward or away from the light-guiding member 25, the light emitted from the light-emitting member 23 can be guided by the first reflective surface 251 and the second reflective surface 252 so as to generate a proper field of illumination, thereby allowing the image captured by the camera 1 to have a good quality. Descriptions are provided as below with accompanied drawings.

Figure 6:
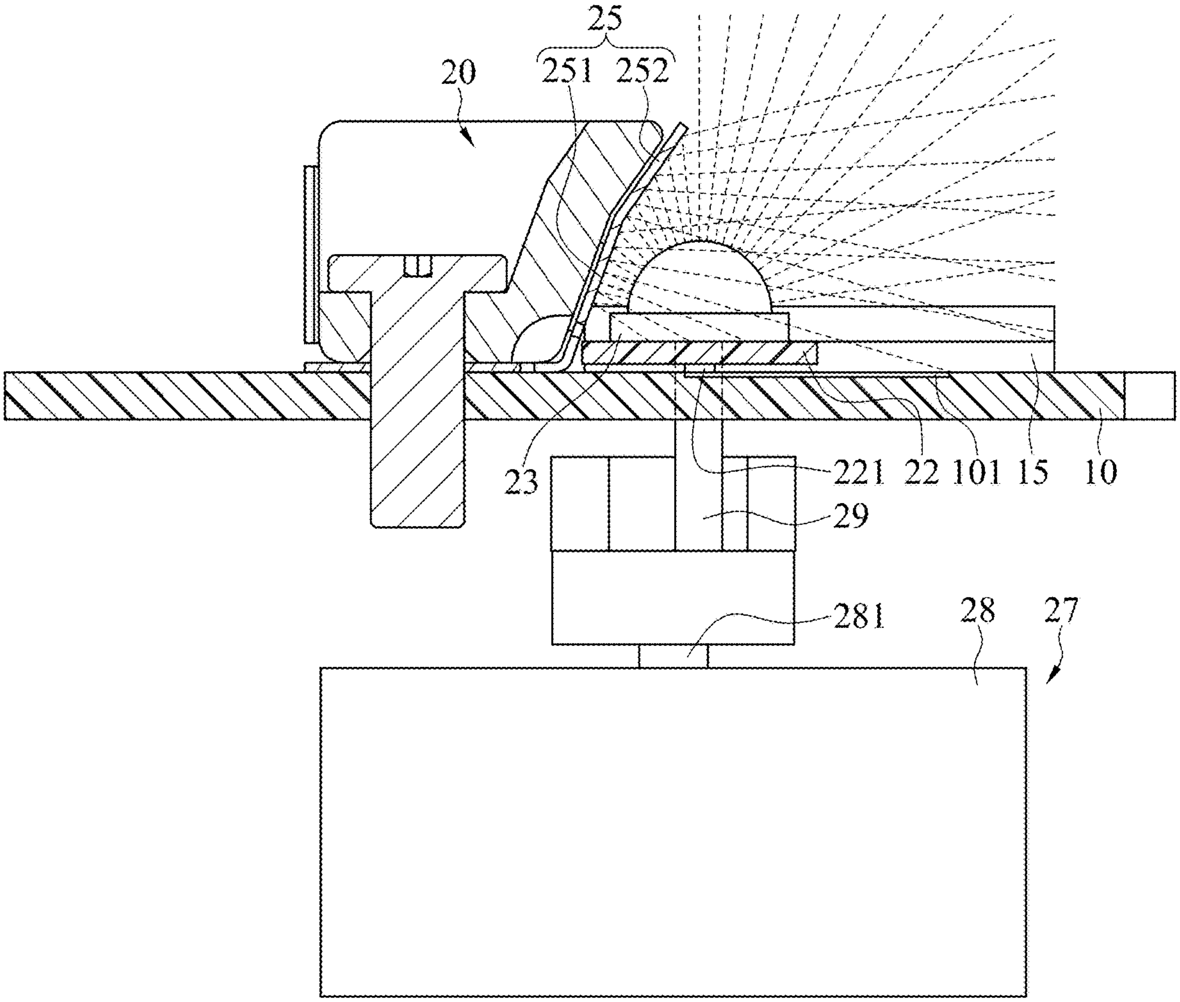
FIG. 6 illustrates a cross-sectional view of the movable member of the light adjustment module according to some embodiments of the instant disclosure, wherein the movable member is at a first position.
Figure 7:
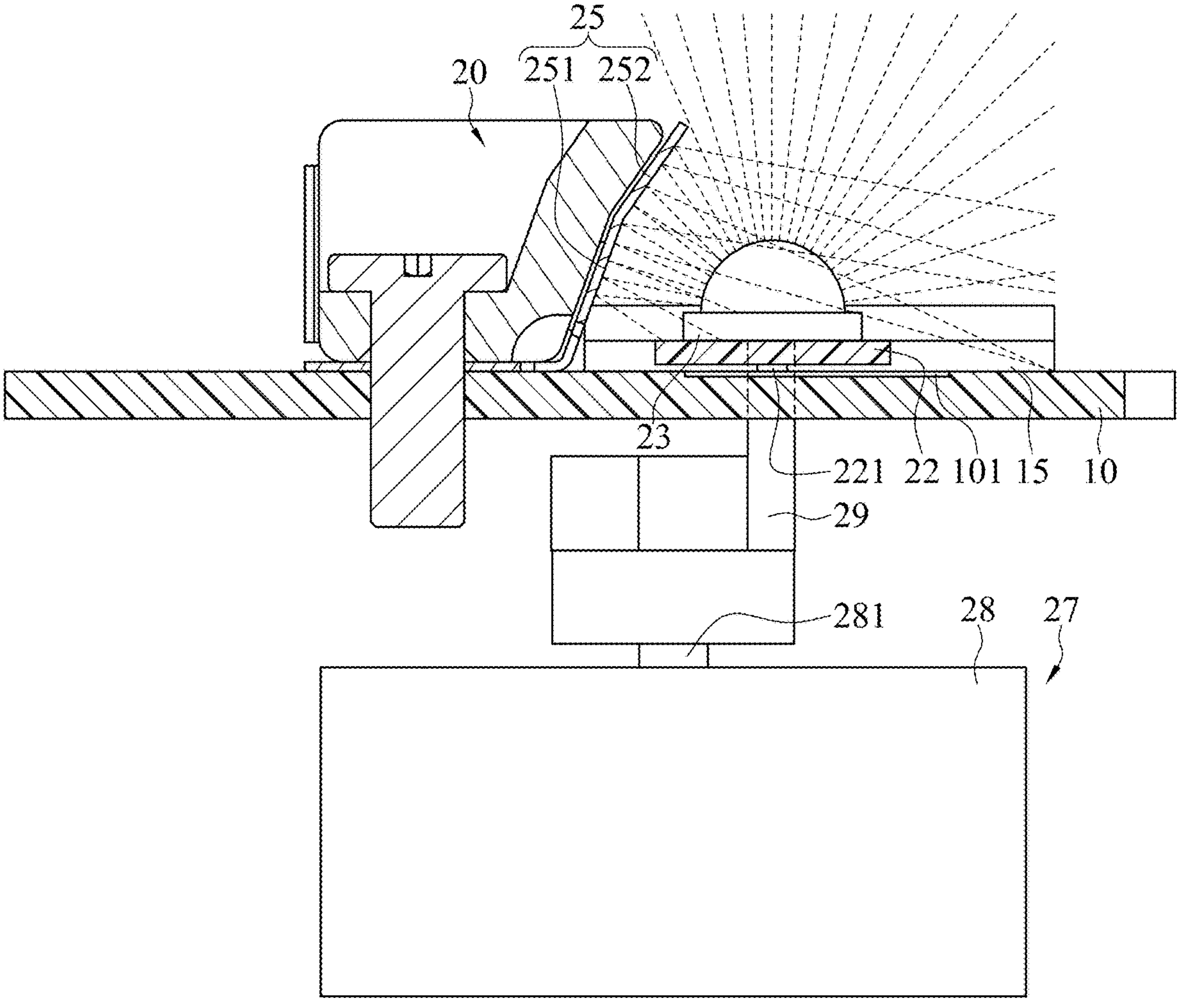
FIG. 7 illustrates a cross-sectional view of the movable member of the light adjustment module according to some embodiments of the instant disclosure, wherein the movable member is at a second position.
Figure 8:
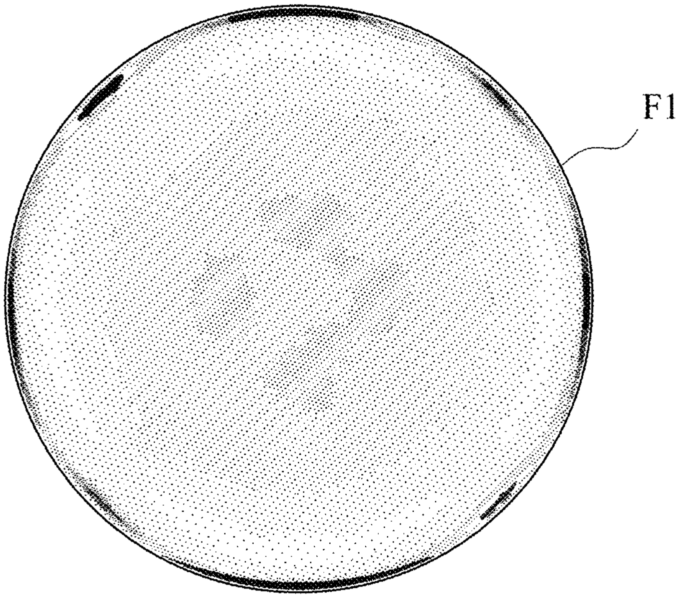
FIG. 8 illustrates a schematic view of the field of illumination of the movable member of the light adjustment module according to some embodiments of the instant disclosure, wherein the movable member is at the first position.
Figure 9:
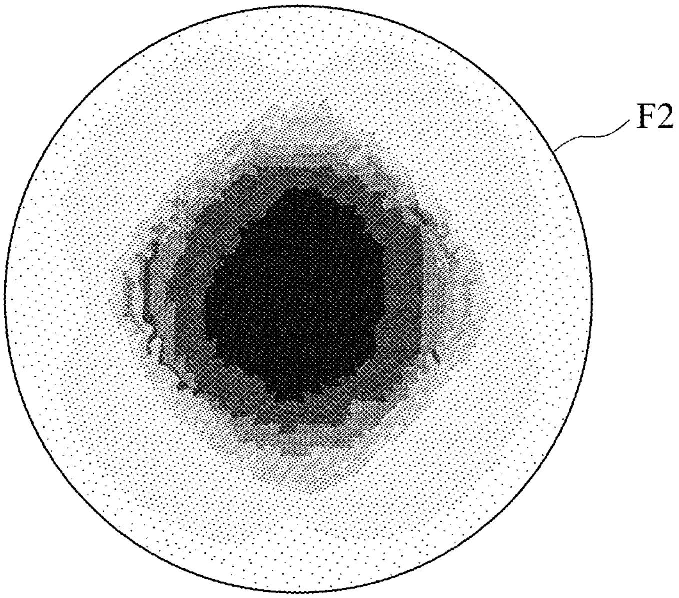
FIG. 9 illustrates a schematic view of the field of illumination of the movable member of the light adjustment module according to some embodiments of the instant disclosure, wherein the movable member is at the second position.

FIG. 6 illustrates a cross-sectional view of the movable member of the light adjustment module according to some embodiments of the instant disclosure, wherein the movable member is at a first position. FIG. 7 illustrates a cross-sectional view of the movable member of the light adjustment module according to some embodiments of the instant disclosure, wherein the movable member is at a second position. FIG. 8 illustrates a schematic view of the field of illumination of the movable member of the light adjustment module according to some embodiments of the instant disclosure, wherein the movable member is at the first position. FIG. 9 illustrates a schematic view of the field of illumination of the movable member of the light adjustment module according to some embodiments of the instant disclosure, wherein the movable member is at the second position. Refer to FIG. 6 and FIG. 8, for each of the light adjustment assemblies 20, when the light-emitting member 23 is moved toward the light-guiding member 25 (as shown in FIG. 6), a majority of the light emitted from the light-emitting member 23 is reflected by the first reflective surface 251 and the second reflective surface 252 of the light-guiding member 25 and thus is guided to the surrounding of the camera 1, and a minority of the light emitted from the light-emitting member 23 illuminate toward the light-emitting direction (the light axis direction) of the light-emitting member 23. Therefore, a first field of illumination F1 in which the central region is darker and the peripheral region is brighter can be generated (as shown in FIG. 8). On the contrary, as shown in FIG. 7 and FIG. 9, when the light-emitting member 23 is moved away from the light-guiding member 25 (as shown in FIG. 7), a minority of the light emitted from the light-emitting member 23 is reflected by the first reflective surface 251 and the second reflective surface 252 of the light-guiding member 25 and thus is guided to the surrounding of the camera 1, and a majority of the light emitted from the light-emitting member 23 illuminate toward the light-emitting direction (the light axis direction) of the light-emitting member 23. Therefore, a second field of illumination F2 in which the central region is brighter and the peripheral region is darker can be generated (as shown in FIG. 9). Accordingly, when the light-emitting member 23 of each of the light adjustment assemblies is moved to different positions, different fields of illumination can be generated to cooperate with different application scenarios of the camera 1.

As shown in FIG. 3, FIG. 6, and FIG. 7, the substrate 10 is provided with a first conductive portion 101. In this embodiment, the first conductive portion 101 is a bar-shaped conductive portion, and the first conductive portion 101 extends along the moving direction of the movable member 22. The movable member 22 of each of the light adjustment assemblies 20 comprises a second conductive portion 221. In this embodiment, the second conductive portion 221 is a point-shaped conductive portion. For each of the light adjustment assemblies 20, the light-emitting member 23 is electrically connected to the second conductive portion 221, and during the movement of the movable member 22 relative to the substrate 10, the second conductive portion 221 can be moved along the first conductive portion 101, and the second conductive portion 221 is electrically in contact with the first conductive portion 101 continuously. Accordingly, the light-emitting member 23 of each of the light adjustment assemblies 20 can be electrically connected to the substrate 10, so that the substrate 10 can supply electricity to the light-emitting member 23 of each of the light adjustment assemblies 20. However, it is understood that the embodiments are provided as examples for illustrative purpose, but not a limitation to the instant disclosure. In some other embodiments, the first conductive portion 101 may be a point-shaped conductive portion, and the second conductive portion 221 may be a bar-shaped conductive portion. Alternatively, in some other embodiments, electricity is supplied to the light-emitting member 23 of each of the light adjustment assemblies 20 through other sources.

In some embodiments, the camera 1 can control the actuating member 27 to drive the movable member 22 to move with respect to the substrate 10 according to the installation orientation of the camera 1. In other words, in some embodiments, when the camera 1 is at different installation orientations, the light-emitting member 23 of each of the light adjustment assemblies 20 may be at different positions so that different fields of illumination can be generated. For example, as shown in FIG. 2 and FIG. 3, in this embodiment, the substrate 10 is provided with a processor 12 and an angle detector 13, the processor 12 is connected to the angle detector 13 and the actuator 27, the angle detector 13 is configured to perform detection to obtain an inclination information, and the processor 12 is configured to control the actuator 27 to drive the movable member 22 to move according to the inclination information. In some embodiments, the angle detector 13 may be a gyroscope, a rotary variable differential transformer (RVDT), or an inductive angle sensor. The processor 12 may be a single-core or multi-core central processing unit (CPU), a programmable general-purpose or special-purpose microprocessor, a digital signal processor (DSP), or the like.

Furthermore, as shown in FIG. 6 and FIG. 7, the processor 12 can control the actuator 27 to drive the movable member 22 and the light-emitting member 23 to move between a first position (the position shown in FIG. 6) and a second position (the position shown in FIG. 7), where the first position is nearer the light-guiding member 25 as compared with the second position (in other words, in this embodiment, a distance between the first position and the light-guiding member 25 is less than the second position and the light-guiding member 25). As mentioned above, when the movable member 22 is at the first position, the light adjustment assemblies 20 generate the first field of illumination F1 in which the central region is darker and the peripheral region is brighter (as shown in FIG. 8); when the movable member 22 is at the second position, the light adjustment assemblies 20 generate the second field of illumination F2 in which the central region is brighter and the peripheral region is darker (as shown in FIG. 9). When the inclination information is a first angle, the processor 12 controls the actuator 27 to drive the movable member 22 to move to the first position, and when the inclination information is a second angle different from the first angle, the processor 12 controls the actuator 27 to drive the movable member 22 to move to the second position. Therefore, the light adjustment assemblies 20 can generate different fields of illumination when the camera 1 is at different inclinations.

Figure 10:
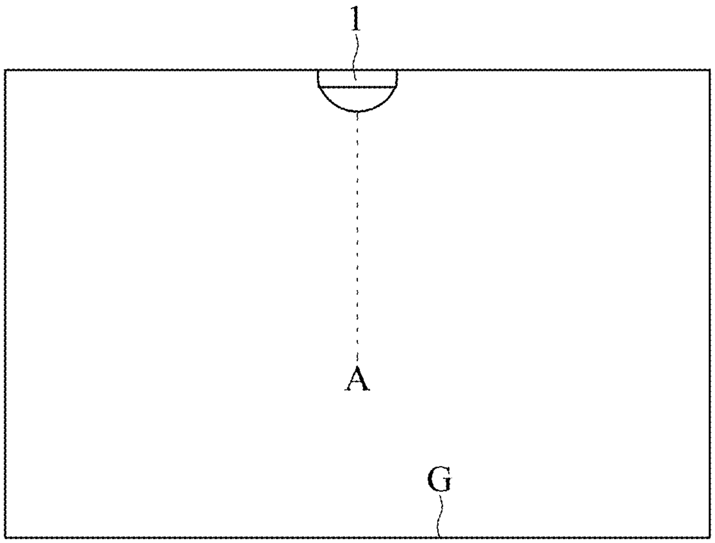
FIG. 10 illustrates a schematic view showing that the camera according to some embodiments of the instant disclosure is installed at an indoor space.

For example, the first angle and the second angle may be angles between a central axis A of the lens arrangement region 11 of the camera 1 and a ground plane G. As shown in FIG. 10, in this embodiment, the camera 1 is at the indoor space, and the camera 1 is installed on the ceiling and the lens of the camera 1 faces the ground, so that the angle between the central axis A of the camera 1 and the ground plane G (the first angle) is about 90 degrees. In general, the distance between the ground and the ceiling is about 2 to 3 m. As a result, when the field of illumination generated by the light adjustment assemblies 20 has a brighter central region, the central region of the image captured by the camera 1 may be prone to be overexposed. Therefore, when the camera 1 is at the first angle (about 90 degrees), the processor 12 can control the actuator 27 to drive the movable member 22 and the light-emitting member 23 to move to the first position (the position shown in FIG. 6) to generate the first field of illumination F1 (as shown in FIG. 8) to prevent the overexposure issue.

Figure 11:
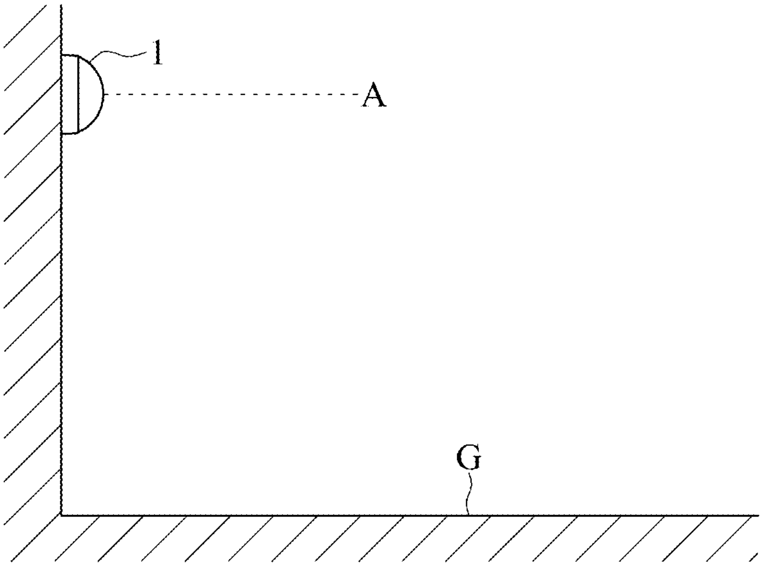
FIG. 11 illustrates a schematic view showing that the camera according to some embodiments of the instant disclosure is installed at an outdoor space.

Furthermore, as shown in FIG. 11, in this embodiment, the camera 1 is at an outdoor space, and the camera 1 is installed on a side wall, so that the angle between the central axis A of the camera 1 and the ground plane G (the second angle) is about 0 degree, and the image-capturing distance of the camera lens 31 of the camera 1 is longer (as compared with the case shown in FIG. 10). As a result, when the field of illumination generated by the light adjustment assemblies 20 has a darker central region, the central region of the image captured by the camera 1 may be prone to be too dark and thus unclear. Therefore, when the camera 1 is at the second angle (about 0 degree), the processor 12 can control the actuator 27 to drive the movable member 22 to move to the second position (the position shown in FIG. 7) to generate the second field of illumination F2 (as shown in FIG. 9) to prevent the underexposure issue. However, it is understood that the values of the first angle and the second angle are provided as examples for illustrative purposes, but not limitations to the instant disclosure.

In some embodiments, the processor 12 can control the actuator 27 to drive the movable member 22 and the light-emitting member 23 to move with respect to the substrate according to a brightness of the image captured by the camera 1. For example, the processor 12 can continuously detect the brightness of the image captured by the camera 1. When the brightness of the image captured by the camera 1 is changed, the processor 12 can control the actuator 27 to change the positions of the light-emitting members 23 of the light adjustment assemblies 20 to generate a proper field of illumination.

Figure 12:
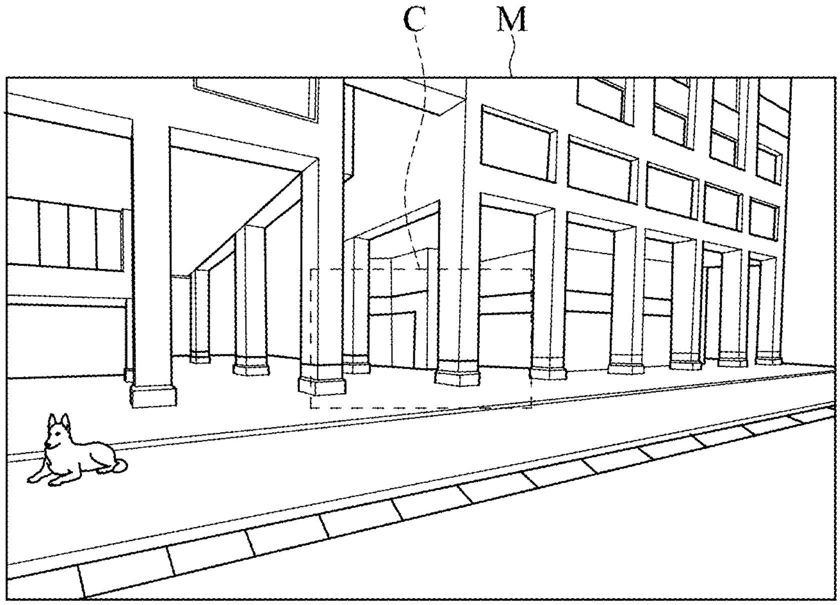
FIG. 12 illustrates a schematic view of an image captured by the camera according to some embodiments of the instant disclosure.

Moreover, as shown in FIG. 12, the processor 12 of the camera 1 is configured to control the actuator 27 to drive the movable member 22 to move according to the brightness of a central region C of a captured image M. In some embodiments, when the central region C of the captured image M is a first brightness, the processor 12 controls the actuator 27 to drive the movable member 22 to move to the first position (as the position shown in FIG. 6); when the central region C of the captured image M is a second brightness less than the first brightness, the processor 12 controls the actuator 27 to drive the movable member 22 to move to the second position (as the position shown in FIG. 7).

For example, the substrate 10 may be provided with a storage 14, the storage 14 is connected to the processor 12, and the storage 14 is configured to store a predetermined brightness range corresponding to the central region C of the captured image M. When the first brightness is greater than the predetermined brightness range, the central region C of the captured image M is too bright, and thus the processor 12 can control the actuator 27 to drive the movable member 22 to move to the first position (the position shown in FIG. 6) to generate the first field of illumination F1 (as shown in FIG. 8). Therefore, the brightness of the central region C of the captured image M can be decreased. On the contrary, when the second brightness is less than the predetermined brightness range, the central region C of the captured image M is too dark, and thus the processor 12 can control the actuator 27 to drive the movable member 22 to move to the second position (the position shown in FIG. 7) to generate the second field of illumination F2 (as shown in FIG. 9). Therefore, the brightness of the central region C of the captured image M can be increased.

In some embodiments, the storage 14 may be any type of fixed or removable random access memory (RAM), read-only memory (ROM), flash memory, or the like.

In some embodiments, the processor 12 is configured to determine whether the movable member 22 is indeed moved to the first position or the second position according to the image information stored in the storage 14. For example, the movable member 22 may have a stroke, the processor 12 can control the actuator 27 to drive the movable member 22 to move; within the stroke of the movable member 22, every time the movable member 22 is moved by a predetermined distance (for example, from 0.01 mm to 1 mm) and thus is at different positions, the processor 12 can detect the image brightness of the captured image M (for example, the brightness of the central region C of the captured image M) for different positions and stores the image brightness in the storage 14. For example, the storage 14 can store a first image brightness corresponding to the first position and a second image brightness corresponding to the second position, and the first image brightness is different from the second image brightness. Accordingly, in one or some embodiments, the processor 12 can determine whether the movable member 22 is indeed moved to the first position according to the first image brightness and whether the movable member 22 is indeed moved to the second position according to the second image brightness.

In some embodiments, the processor 12 of the camera 1 can drive the movable member 22 to move to change the positions of the light-emitting members 23 according to the control command of a user. For example, the processor 12 can be connected to a user's mobile device (such as a cell phone or a tablet computer) through a wired or wireless communication interface, and the user can transmit a control command through the mobile device according to actual application situations (such as the image brightness or the orientation of the camera 1), and the processor 12 can receive the control command through the wired or wireless communication interface to drive the movable member 22 and the light-emitting member 23 to move, so that the user can configure a customized field of illumination.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A light adjustment module for a camera, wherein the light adjustment module comprises:
- a substrate having a lens arrangement region; and
- a plurality of light adjustment assemblies on the substrate, wherein the light adjustment assemblies are spaced apart from each other and surround a periphery of the lens arrangement region, and each of the light adjustment assemblies comprises:
  - a light-emitting unit comprising a movable member and a light-emitting member, wherein the light-emitting member is on the movable member;
  - a light-guiding member having a reflective surface facing the light-emitting member; and
  - an actuator connected to the movable member, wherein the actuator is configured to selectively drive the movable member to move with respect to the light-guiding member, so that the light-emitting member is moved toward or away from the light-guiding member;
- wherein the substrate is provided with a processor, and the processor is configured to control the actuator to drive the movable member to move according to a brightness of a central region of a captured image;
- wherein the actuator is configured to selectively drive the movable member to move between a first position and a second position, and the first position is nearer the light-guiding member as compared with the second position; when the central region has a first brightness, the processor controls the actuator to drive the movable member to move to the first position; when the central region has a second brightness, the processor controls the actuator to drive the movable member to move to the second position, and the first brightness is greater than the second brightness.

2. The light adjustment module for the camera according to claim 1, wherein the reflective surface comprises a first reflective surface and a second reflective surface, the first reflective surface is nearer the substrate as compared with the second reflective surface, the second reflective surface is connected to the first reflective surface, and an included angle between the first reflective surface is greater than an included angle between the second reflective surface and the substrate.

3. The light adjustment module for the camera according to claim 1, wherein the substrate is provided with a storage, the storage is connected to the processor, the storage is configured to store an image brightness corresponding to the first position, and the processor is configured to determine whether the movable member is to be moved to the first position according to the image brightness.

4. The light adjustment module for the camera according to claim 1, wherein the actuator comprises a driving motor and a connecting member, and the driving motor is connected to the movable member through the connecting member.

5. The light adjustment module for the camera according to claim 4, wherein the driving motor has a shaft, the connecting member is a swing arm, one of two ends of the swing arm is connected to the shaft, and the other end of the swing arm is pivotally connected to the movable member.

6. The light adjustment module for the camera according to claim 1, wherein the substrate is provided with a plurality of slide rails, the slide rails surround the periphery of the lens arrangement region and respectively correspond to the light adjustment assemblies, and the movable member of each of the light adjustment assemblies is slidably connected to a corresponding one of the slide rails.

7. The light adjustment module for the camera according to claim 1, wherein the substrate is provided with a first conductive portion; for each of the light adjustment assemblies, the movable member comprises a second conductive portion, and the light-emitting member is electrically connected to the second conductive portions; for each of the light adjustment assemblies, during a movement of the movable member relative to the substrate, the first conductive portion is electrically in contact with the second conductive portion continuously.

8. A camera comprising:

a camera body;

a light adjustment module according to claim 1, wherein the light adjustment module is inside the camera body; and a camera lens at the camera arrangement region of the substrate of the light adjustment module.

9. A light adjustment module for the camera, wherein the light adjustment module comprises:

a substrate having a lens arrangement region; and a plurality of light adjustment assemblies on the substrate, wherein the light adjustment assemblies are spaced apart from each other and surround a periphery of the lens arrangement region, and each of the light adjustment assemblies comprises:

a light-emitting unit comprising a movable member and a light-emitting member, wherein the light-emitting member is on the movable member;

a light-guiding member having a reflective surface facing the light-emitting member; and an actuator connected to the movable member, wherein the actuator is configured to selectively drive the movable member to move with respect to the light-guiding member, so that the light-emitting member is moved toward or away from the light-guiding member;

wherein the substrate is provided with a processor and an angle detector, the processor is connected to the angle detector and the actuator, the angle detector is configured to perform detection to obtain an inclination information, and the processor is configured to control the actuator to drive the movable member to move according to the inclination information.

10. The light adjustment module for the camera according to claim 9, wherein the actuator is configured to selectively drive the movable member to move between a first position and a second position, and the first position is nearer the light-guiding member as compared with the second position; when the inclination information is a first angle, the processor controls the actuator to drive the movable member to move to the first position; when the inclination information is a second angle, the processor controls the actuator to drive the movable member to move to the second position, and the first angle is different from the second angle.

11. The light adjustment module for the camera according to claim 10, wherein the first angle and the second angle are angles between a central axis of the lens arrangement region and a ground plane, and the first angle is greater than the second angle.

* * * * *